United States Patent
Tsuruta et al.

(10) Patent No.: US 6,988,573 B2
(45) Date of Patent: Jan. 24, 2006

(54) COOLING SYSTEM FOR INTERNAL COMBUSTION ENGINE

(75) Inventors: Yuuichirou Tsuruta, Wako (JP); Katsumi Kanai, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 257 days.

(21) Appl. No.: 10/672,347

(22) Filed: Sep. 25, 2003

(65) Prior Publication Data

US 2004/0129467 A1   Jul. 8, 2004

(30) Foreign Application Priority Data

Sep. 30, 2002   (JP)   ............... 2002-285821

(51) Int. Cl.
   *B60K 11/00*   (2006.01)
   *B60K 13/02*   (2006.01)
   *F01P 1/00*    (2006.01)
   *F02K 7/08*    (2006.01)

(52) U.S. Cl. ............... 180/68.1; 180/68.2; 180/68.3; 123/41.56; 60/912

(58) Field of Classification Search ............... 180/68.1, 180/68.2, 68.3; 123/41.56; 60/912; F01P 1/10, F01P 5/06; F02F 1/28; B62J 39/00; B60K 11/06; B62K 5/00

See application file for complete search history.

(56) References Cited

U.S. PATENT DOCUMENTS

| 1,925,415 | A | * | 9/1933 | Strauss | 180/68.1 |
| 1,974,033 | A | * | 9/1934 | Nallinger | 180/68.1 |
| 2,191,599 | A | * | 2/1940 | Valletta | 180/68.1 |
| 2,614,654 | A | * | 10/1952 | Strinden | 454/158 |
| 3,506,082 | A | * | 4/1970 | Cadiou | 180/68.1 |
| 5,251,718 | A | * | 10/1993 | Inagawa et al. | 180/190 |
| 6,216,809 | B1 | * | 4/2001 | Etou et al. | 180/68.3 |
| 2003/0029656 | A1 | * | 2/2003 | Matsuura et al. | 180/68.2 |

FOREIGN PATENT DOCUMENTS

| JP | 56000512 A | * | 1/1981 |
| JP | 56-111215 | | 8/1981 |
| JP | 62105719 A | * | 5/1987 |
| JP | 62-56032 | | 11/1987 |
| JP | 02144228 A | * | 6/1990 |
| JP | 03279018 A | * | 12/1991 |
| JP | 05112271 A | * | 5/1993 |
| JP | 08091277 A | * | 4/1996 |
| JP | 2002264875 A | * | 9/2002 |

* cited by examiner

*Primary Examiner*—Allen Shriver
*Assistant Examiner*—G B Klebe
(74) *Attorney, Agent, or Firm*—Hamre, Schumann, Mueller & Larson, P.C.

(57) ABSTRACT

A cooling air path is formed by an air duct provided in front of an engine and below main frames. The air duct has a cooling air port that is almost the same width, in plan view, as the lateral width of the main frames and a discharge port is formed thinner than the cooling air port, further to the rear than the cooling air port and in the vicinity of the engine.

8 Claims, 8 Drawing Sheets

COOLING SYSTEM FOR INTERNAL COMBUSTION ENGINE

BACKGROUND OF THE INVENTION

1. Field of the Invention

The present invention relates to a cooling system for an internal combustion engine that efficiently cools an internal engine while also making an effective use of space.

2. Description of the Related Art

As a method for cooling a combustion engine, it is known to provide a ventilation path for guiding traveling air to an internal combustion engine. For example, Japanese Patent Examined Publication No. Sho. 62-56032 (paragraphs 2–3, FIG. 1) discloses such a method.

Figure 7:
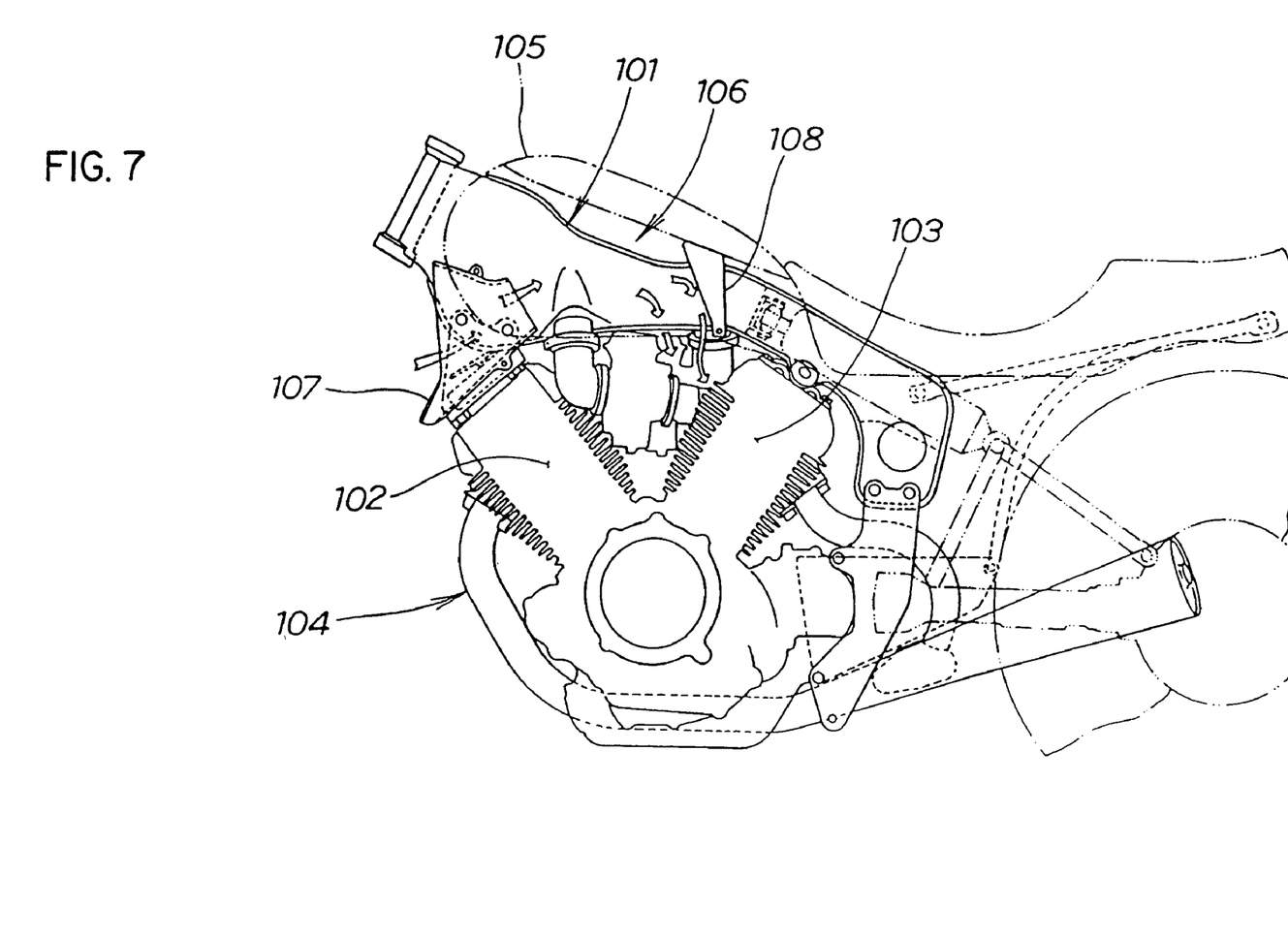
FIG. 7 is a side elevation of essential parts of a vehicle for describing the cooler for an internal combustion engine of the related art.

FIG. 7 is a side elevation of essential parts of a conventional vehicle. FIG. 7 shows a V-type air-cooled engine 104 having a cylinder 102 and a cylinder 103 arranged longitudinally fitted to a lower part of a main frame 101, a fuel tank 105 having a substantially U-shaped cross section so as to straddle to the left and right of the mainframe 101 fitted to an upper part of the main frame 101, and a ventilation path 106 formed between an inner surface of this fuel tank 105 and the main frame 101. It is easy to lead air to the inside of the ventilation path 106 by passing a cooling air plate 107 over the front cylinder 102 and the main frame 101 and wind inside the ventilation path 106 is guided to the rear cylinder 103 by providing a cooling air member 108 to the rear of the ventilation path 106.

In FIG. 7, air guided to the inside of the ventilation path 106 is curved downwards at almost a right angle by the cooling air member 108, which means that flow rate is lowered by resistance. Therefore, it is not possible to obtain a sufficient air volume to cool the cylinder 103. Also, if a gap between the main frame 101 and the inner surface of the fuel tank 105 is widened in order to obtain sufficient air volume, the main frame 101 will become narrower, the capacity of the fuel tanks 105 will be reduced, and space for components around the ventilation path 106 will be restricted.

A structure for directing wind to spark plugs of an internal combustion engine is also known. For example, Japanese Patent Laid-open No. Sho. 56-111215 (Paragraph 2–3, FIG. 2) discloses such a structure.

Figure 8:
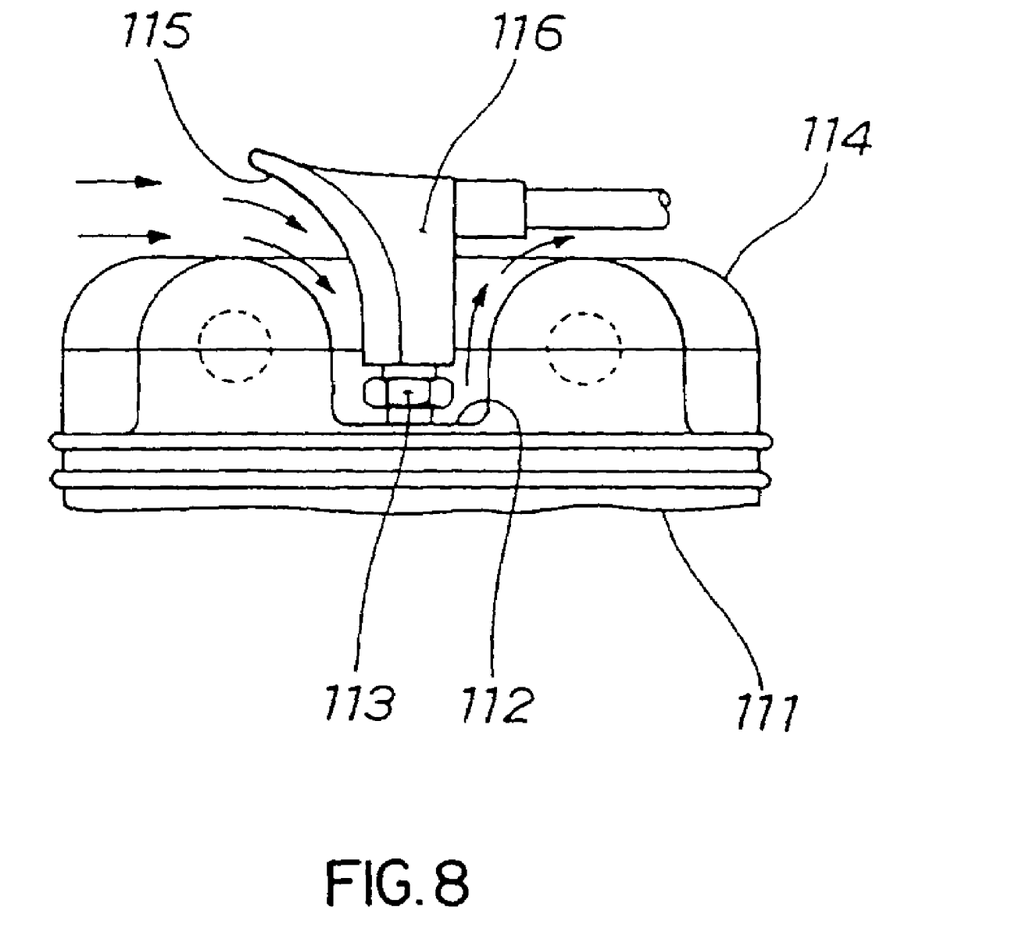
FIG. 8 is a side elevation of a cylinder head for describing a cooler for an internal combustion engine of the related art.

FIG. 8 is a side elevation of a cylinder head for describing a conventional cooler for an internal combustion engine. A spark plug 113 is fitted into an indentation 112 of a cylinder head 111, a head cover 114 is fitted to the cylinder head 111, and a cooling air funnel 115 for leading wind to the indentation 112 is provided on a plug cap 116 so as to be positioned further down by the head cover 114.

In FIG. 8 also, since air is curved downwards from the horizontal direction by the cooling air funnel 115 and guided to the inside of the indentation 112, and further, flows out upwards from the inside of the indentation 112, there is a large resistance to the traveling wind which lowers the flow rate of the air and it is not possible to obtain a sufficient air volume to cool the spark plug 13.

Also, since the cooling air funnel 115 is arranged so both of two spark plugs 113, 113, which are provided apart from each other, are cooled, air is also guided to a section between the two spark plugs 113, 113. Thus, it would be desirable to lead the air in this section to the higher temperature spark plugs 113, 113 in a localized manner, which would cooling efficiency.

It is an object of the present invention to improve a cooler for an internal combustion engine in order to (1) obtain sufficient air volume to cool an internal combustion engine, (2) lead cooling air in a localized manner, and (3) increase freedom of design for components arranged around the cooling air path.

SUMMARY OF THE INVENTION

In order to achieve the above described objects, claim 1 is directed to a cooler for an internal combustion engine, having an air-cooled internal combustion engine fitted between a pair of left and right vehicle frames, a fuel tank attached to the vehicle frames arranged above the internal combustion engine, and provided with a cooling air path, for guiding traveling air from in front of the vehicle to the internal combustion engine in order to cool the internal combustion engine, wherein the cooling air path is formed by a duct provided in front of the internal combustion engine and below the vehicle frames, this duct having a cooling air port that is almost the same width, in plan view, as the lateral width of the vehicle frames, and a discharge port formed thinner than the cooling air port, further to the rear than the cooling air port and in the vicinity of the internal combustion engine.

By increasing the width of the cooling air port of the duct to be the same as the width of the left and right vehicle frames, it is possible to bring a large volume of air into the inside of the duct, a sufficient volume of air is guided to the internal combustion engine arranged substantially in the middle of the vehicle, and cooling efficiency is improved.

Also, by making the discharge port of the duct thinner than the cooling air port, it is possible to increase the flow rate of air taken into the duct at the discharge port, and it is possible to cool the internal combustion engine, particularly sections that are high temperature, in a localized manner and with good efficiency.

Also, if the vertical width of the duct is made small, it is possible to increase a space for components arranged above and below the duct, and it is possible to increase the design freedom for these components.

Claim 2 is directed to having the discharge port oriented towards spark plugs provided in the internal combustion engine. It is possible to cool in a localized manner in the vicinity of the spark plugs, and it is possible to suppress excessive increase in temperature of the spark plugs.

Claim 3 is directed to the cooling air path being provided on an all-terrain vehicle having front wheels suspended on the vehicle frames so as to be capable of moving up and down and a fender for covering the front wheels and the front of the vehicle. With an all-terrain vehicle having a large fender for covering the front wheels and the front of the vehicle, it is possible to efficiently cool essential areas of the internal combustion engine arranged almost in the middle of the vehicle, particularly the vicinity of the spark plugs, using the duct.

DETAILED DESCRIPTION OF THE INVENTION

Figure 1:
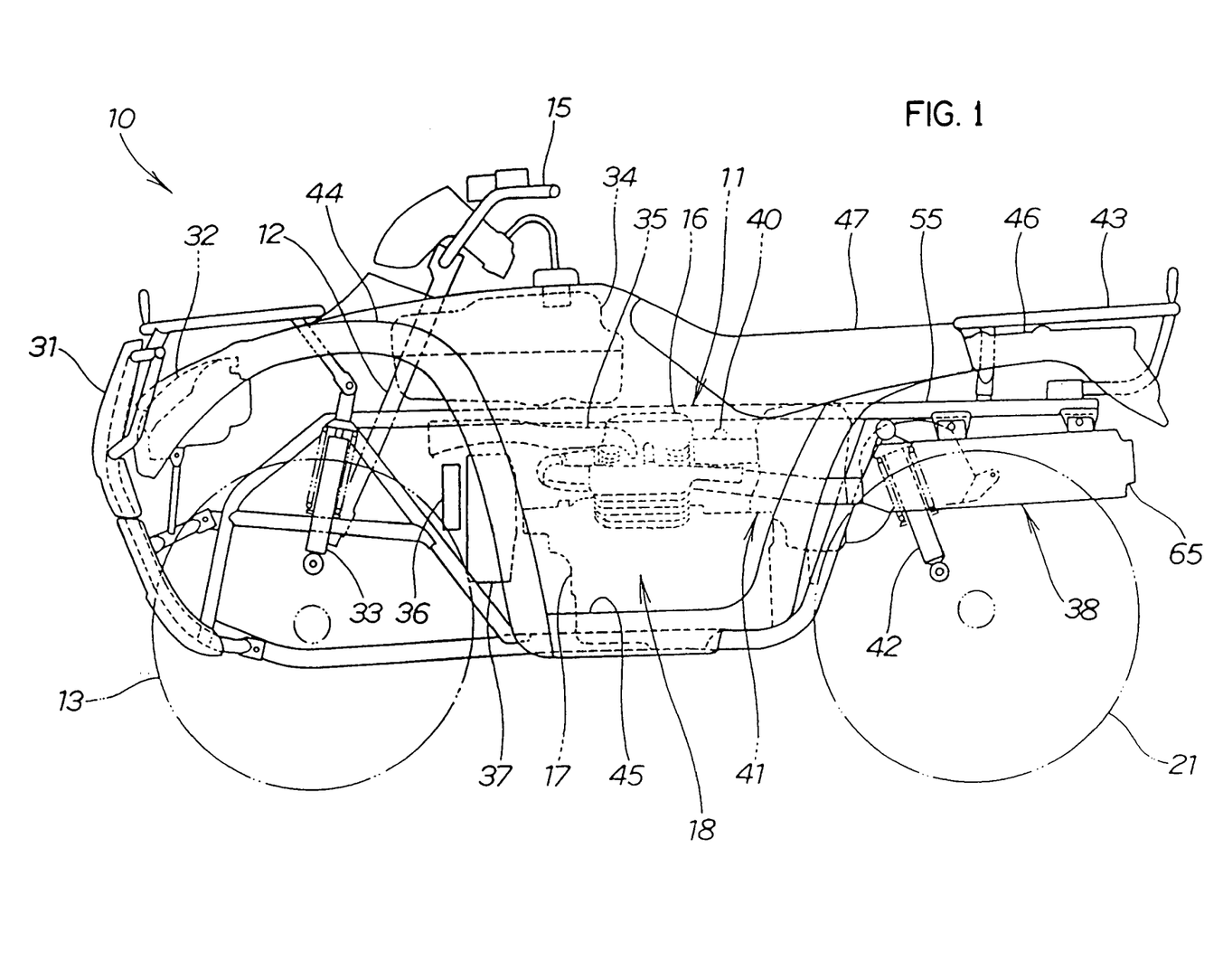
FIG. 1 is a side elevation of a vehicle fitted with an engine provided with the cooler of the present invention.

Embodiments of the present invention will now be described based on the attached drawings. FIG. 1 is a side elevation of a vehicle fitted with an engine provided with the cooling system of the present invention. The vehicle 10 is an all-terrain vehicle having a handlebar post 12 attached to a front part of a vehicle frame 11, a lower end of the handlebar post 12 joined to left and right front wheels 13, 14 (only the near side front wheel 13 is shown in the drawing), a handlebar 15 attached to an upper end of the handlebar post 12, a power unit 18 comprising an engine 16 as an internal combustion engine and a transmission 17 fitted into the middle of the vehicle frame 11, and rear wheels 21, 22 (only the near side rear wheel 21 is shown in the drawing) driven by the power unit 18 together with the front wheels 13, 14 are arranged at a rear part of the vehicle frame 11.

Here, reference numeral 31 is a front guard for protecting the vehicle front surface, 32, 32 are headlamps (only the nearside headlamp 32 is shown), 33, 33 are shock absorbers for the front wheels 13, 14 (only the nearside shock absorber 33 is shown), 34 is a fuel tank attached to the vehicle frame 11, 35 is an air duct for supplying air to high temperature parts of the engine 16, 36 is an oil cooler, 37 is a shroud enclosing a fan for the oil cooler 36, 38 is an exhaust unit connected to the front of the engine 16 and extending in a curved manner towards the rear, 40 is a carburetor connected to a rear part of the engine 16, 41 is an air cleaner unit connected to a rear part of the carburetor 40, 42, 42 are shock absorbers for the rear wheels 21, 22 (only the near side shock absorber 42 is shown), 43 is a rear carrier on which luggage is placed, 44, 44 are front fenders for covering upper and upper rear parts of the front wheels 13, 14 (only the nearside fender 44 is shown), 45, 45 are steps on which a driver places their feet (only the near side step 45 is shown), 46, 46 are rear fenders for covering front and upper parts of the rear wheels 21, 22 (only the nearside fender 46 is shown), and 47 is a seat.

Figure 2:
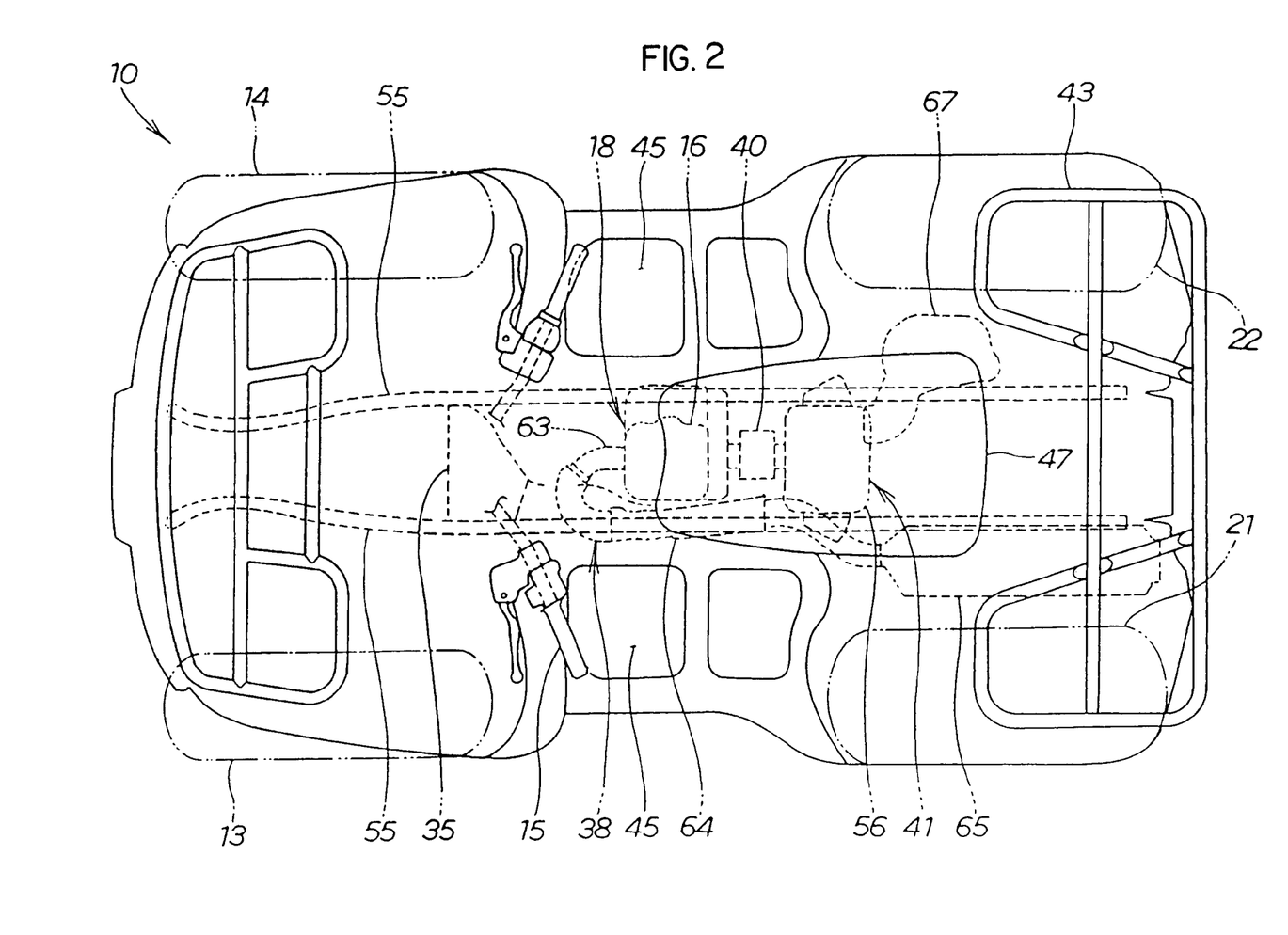
FIG. 2 is a plan view of a vehicle to which the present invention relates.

FIG. 2 is a plan view of a vehicle to which the present invention relates, and shows left and right main frames 55, 55 constituting a part of the vehicle frame 11 arranged in the center of the vehicle and extending longitudinally, the power unit 18, air duct 15 for cooling the engine and main air cleaner 56, constituting the air cleaner unit 41, arranged between these main frames 55, 55, the front end of the air duct 35 being almost the same width as the main frames 55, 55, and the exhaust unit 38 curving through a U-shape from the engine 16 to extend towards the rear.

The exhaust unit 38 is made up of a U-shaped exhaust pipe 63 that curves in a U-shape, a middle exhaust pipe 64 connecting to a rear part of the U-shaped exhaust pipe 63, and a muffler 65 attached to a rear part of the middle exhaust pipe 64. As shown in FIG. 1, the muffler 65 is attached to the rear part of one of the main frames 55.

The air cleaner unit 41 comprises the main air cleaner 56 connected to the carburetor 40, and a sub air cleaner 67 connected to a rear part of the main air cleaner 56. The main air cleaner 56 and the sub air cleaner 67 are arranged side by side in the longitudinal direction of the vehicle. The sub air cleaner 67 is arranged outside one of the main frames 55 and inside the rear wheel 22, with the main air cleaner 56 attached to the main frames 55, 55 and a rear part of the sub air cleaner 67 being attached to one of the main frames 55.

Figure 3:
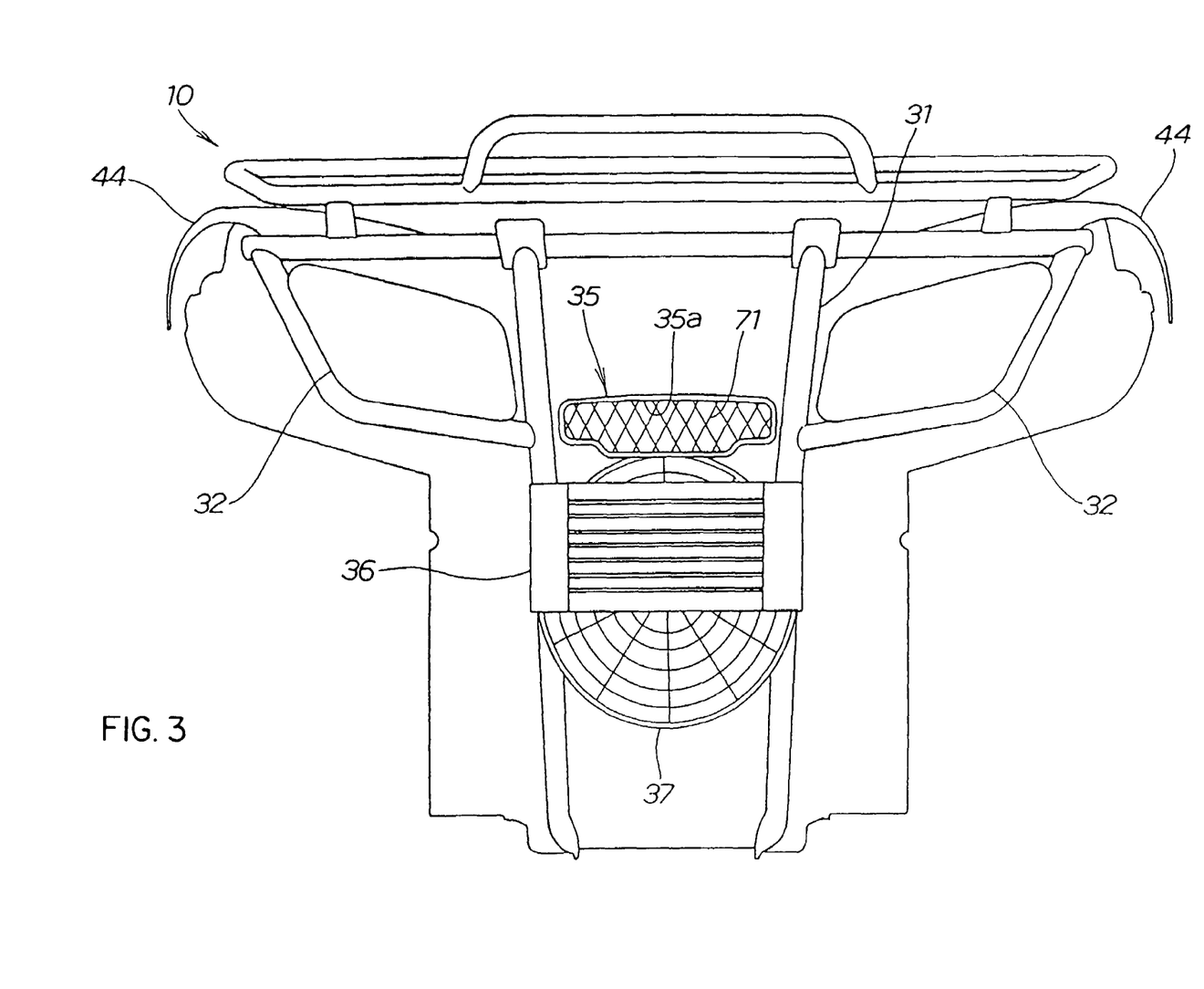
FIG. 3 is a front view of a vehicle to which the present invention relates.

FIG. 3 is a front view of a vehicle to which the present invention relates, and shows a shroud 37 housing a fan provided behind the oil cooler 36 and the air duct 35 arranged above the shroud 37.

The air duct 35 has a vertically flat shape, and has a mesh member 71 attached for preventing foreign matter from entering the cooling port 35a having almost the same width as a lateral gap between the main frames 55, 55 (refer to FIG. 2).

Figure 4:
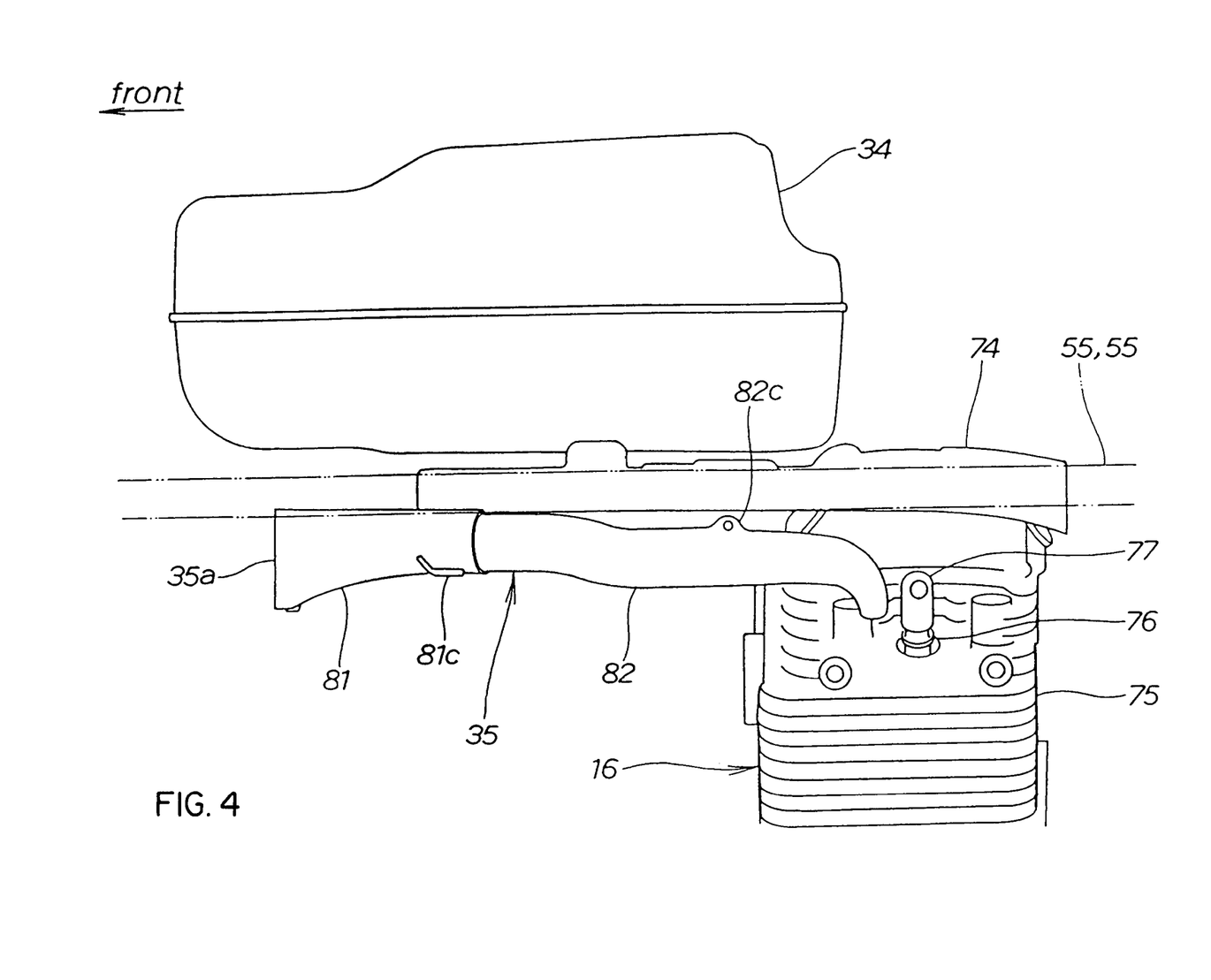
FIG. 4 is a side elevation view describing arrangement of an air duct relating to the present invention.

FIG. 4 is a side elevation view describing the arrangement of an air duct relating to the present invention (the arrow "front" indicates to the front of the vehicle in this figure and others). A heat shield plate 74 attached to the main frames 55, 55 arranged between the engine 16 and the fuel tank 34 so that heat is not conveyed from the engine 16 to the fuel tank 34, with the air duct 35 being arranged below the heat shield plate 74 and the main frames 55, 55, and in front of the engine 16, and a rear end of the air duct 35 being in the vicinity of and oriented towards the spark plug 76 provided in the cylinder head 75 of the engine 16. Reference numeral 77 is a plug cap.

The air duct 35 is a component bridging from the front end to the rear end, having almost equal upper and lower widths, which are narrow, and extending in an almost straight manner, and as a result it is possible to arrange the air duct 35 without interfering with components arranged above and below the air duct 35, it is possible to provide surplus space for components arranged above and below, and it is possible to increase the design freedom for these components, and since the air duct 35 extends in an almost straight line it is possible to reduce resistance of the passageway.

Figure 5:
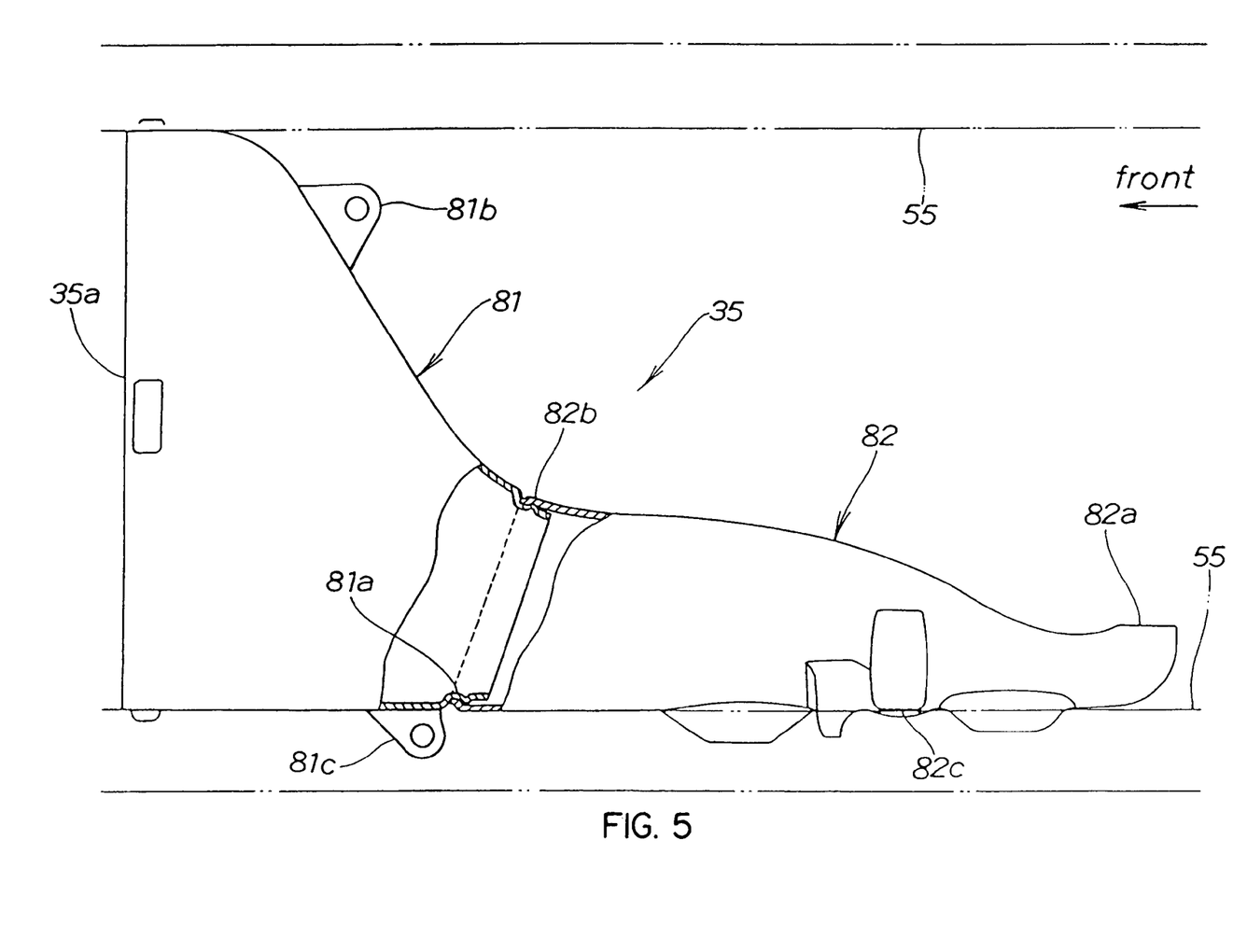
FIG. 5 is a plan view of an air duct relating to the present invention.

FIG. 5 is a plan view of an air duct relating to the present invention, and the air duct 35 comprises a front duct 81 provided with a cooling port 35a, and a rear duct 82 connecting to the vehicle rear side of this front duct 81.

The front duct 81 is a triangular shape made wider at the cooling port 35a side, becoming narrower towards the rear of the vehicle, and is provided with a stepped section 81a for connection with the rear duct 82, and front attachment sections 81b, 81c for attachment to the shroud 37 (refer to FIG. 1).

The rear duct 82 becomes gradually narrow going from the front end to the rear end, and is provided with a discharge port 82a for discharging air, an engagement section 82b for engaging with the stepped section 81a of the front duct 81, and a rear attachment section 82c for attachment to a front frame 55.

In this way, the air duct 35 has a structure in which the cooling port 35a is made wide, with the width becoming narrow from the cooling port 35a towards the rear of the vehicle and being extremely narrow at the discharge port 82a (that is, the cross section of the passage becomes gradually restricted).

Figure 6:
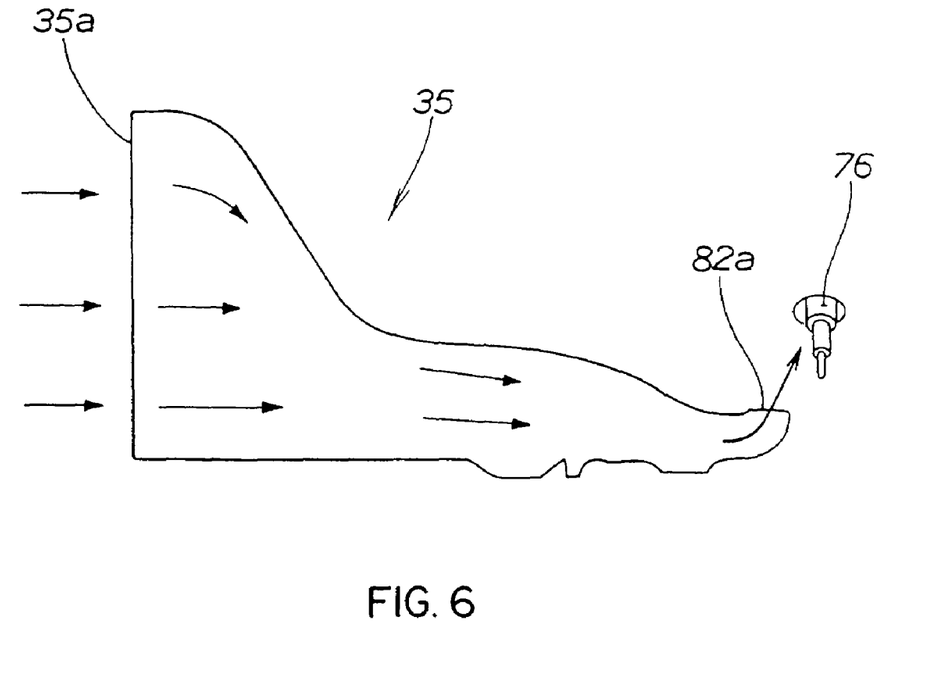
FIG. 6 is a drawing illustrating an operation of the duct relating to the present invention.

Next, operation of the air duct 35 described above will be described. FIG. 6 is a drawing illustrating an operation of the duct relating to the present invention. During travel of the vehicle, a sufficient volume of air flows into the air duct 35 from the widened cooling port 35a. Then, the air flow rate is gradually increased by the narrowed passage, air flow rate becomes extremely high at the discharge port 82a, this air blasts towards the spark plug, which is at a high temperature, and the spark plug 76 is cooled.

As described in FIG. 4 and FIG. 5 above, the present invention provides a cooler for an air cooled engine 16. The air-cooled engine 16 is fitted into a pair of left and right main frames 55, 55, and a fuel tank 34 is attached to the main frames 55, 55 arranged above the engine 16. A cooling path, for guiding traveling air from in front of the vehicle to the engine 16 is provided in order to cool the engine 16. The cooling air path is formed by an air duct 35 provided in front of the engine 16 and below the main frames 55, 55, this air duct 35 having a cooling air port 35a that is almost the same width, in plan view, as the lateral width of the main frames 55, 55. A discharge port 82a is formed thinner than the cooling air port 35a, further to the rear than the cooling air port 35a and in the vicinity of the engine 16.

By making the width of the cooling port 35a of the air duct 35 almost as wide as the lateral width of the main frames 55, it is possible to draw a larger volume of air into the inside of the air duct 35, and it is possible to lead a sufficient volume of air to the engine 16 arranged almost at the center of the vehicle to increase cooling efficiency.

Also, by forming the discharge port 82a narrower than the cooling port 35a, it is possible to increase flow rate of air at the discharge port 82a, and it is possible to cool particularly high temperature parts of the engine 16 in a localized manner and with good efficiency.

Also, if the vertical width of the air duct 35 is made small, it is possible to increase space for components arranged above and below the air duct 35, and it is possible to increase the design freedom for these components.

In addition, the present invention has the discharge port 82a oriented towards a spark plug 76 provided in the engine 16. It is possible to direct air flow in the vicinity of the spark plug 76 in a localized manner, and to suppress excessive rises in the temperature of the spark plug 76.

Moreover, as described in FIG. 1, the present invention has the cooling air path provided on an all-terrain vehicle 10 having front wheels 13, 14 suspended on the vehicle frames 11 so as to be capable of moving up and down and front fenders 44, 44 for covering the front wheels 13, 14 and the front of the vehicle. With an all-terrain vehicle 10 having large fenders 44, 44 for covering the front wheels 13, 14 and the front of the vehicle, it is possible to efficiently cool essential areas of the engine 16 arranged almost in the middle of the vehicle, particularly the vicinity of the spark plugs 76 (refer to FIG. 4), using the air duct 35.

The present invention brings about the following benefits by using the above described structure. Since the cooler for an internal combustion engine has the cooling air path formed by a duct provided in front of the internal combustion engine and below vehicle frames, this duct having a cooling air port that is almost the same width, in plan view, as the lateral width of the main frames, and a discharge port formed thinner than the cooling air port, further to the rear than the cooling air port and in the vicinity of the internal combustion engine, it is possible to bring a larger volume of air into the inside of the duct and it is possible to increase the cooling efficiency by guiding a sufficient volume of air to the internal combustion engine, which is arranged substantially in the middle of the vehicle.

Also, by forming the discharge port narrower than the cooling port, it is possible to increase flow rate of air taken in to the duct at the discharge port, and it is possible to cool particularly high temperature parts of the internal combustion engine in a localized manner with good efficiency.

Also, if the vertical width of the duct is made small, it is possible to increase space for components arranged above and below the duct, and it is possible to increase the design freedom for these components.

Since the cooling system has the discharge port oriented towards a spark plug provided in the internal combustion engine, it is possible to direct air flow in the vicinity of the spark plug in a localized manner, and to suppress excessive rises in the temperature of the spark plug.

Since the cooling system has the cooling air path provided on an all-terrain vehicle having front wheels suspended on the vehicle frames so as to be capable of moving up and down and fenders for covering the front wheels and the front of the vehicle, it is possible to efficiently cool essential areas of the internal combustion engine arranged almost in the middle of the vehicle, particularly the vicinity of the spark plugs, using the air duct.

What is claimed is:

1. A cooling system for a vehicle with an internal combustion engine, the vehicle having an air-cooled internal combustion engine fitted between a pair of left and right vehicle frames, and a fuel tank attached to the vehicle frames arranged above the internal combustion engine, the cooling system comprising:
a cooling air path, the path configured to guide air from a front of the vehicle to the internal combustion engine, wherein the cooling air path is formed by a duct provided in front of the internal combustion engine and below the vehicle frames, the duct having a cooling air port that is substantially the same width, in plan view, as the lateral distance between the vehicle frames, and a discharge port that is thinner than the cooling air port and located further to the rear than the cooling air port and in the vicinity of the internal combustion engine.

2. The cooling system according to claim 1, wherein the discharge port is oriented towards at least one spark plug provided in the internal combustion engine.

3. The cooling system according to claim 1, wherein the vehicle is an all-terrain vehicle having front wheels suspended on the vehicle frames so as to be capable of moving up and down and a fender configured to cover front wheels and a front of the vehicle.

4. The cooling system according to claim 2, wherein the vehicle is an all-terrain vehicle having front wheels suspended on the vehicle frames so as to be capable of moving up and down and a fender configured to cover front wheels and a front of the vehicle.

5. A four wheel, all-terrain vehicle, the vehicle comprising:
at least two frame members extending longitudinally and separated from each other in a width direction of the vehicle;
four wheels, each wheel being coupled to one of the frame members;
an air-cooled combustion engine disposed between the at least two frame members;
a fuel tank disposed above the engine and attached to the at least two frame members; and
a cooling member, the cooling member comprising an intake port and a discharge port, the cooling member being disposed below the fuel tank,
wherein the intake port is located towards a front of the vehicle and is configured to be substantially as wide as the width between the at least two frame members, and the discharge port is located in the vicinity of the engine and is configured to be substantially narrower in width than the intake port.

6. The vehicle according to claim 5, wherein a vertical height of the cooling member is substantially smaller than the width of the cooling member at the intake port.

7. The vehicle according to claim 5, wherein an end of the discharge port that discharges air faces at least one spark plug of the engine.

8. A four wheel, all-terrain vehicle, the vehicle comprising:

at least two frame members extending longitudinally and separated from each other in a width direction of the vehicle;

four wheels, each wheel being coupled to one of the frame members;

engine means for driving the vehicle, the engine means being disposed between the at least two frame members;

tank means for storing fuel, the tank means being disposed above the engine and attached to the at least two frame members; and cooling means for guiding air from a front of the vehicle to a vicinity of the engine means, the cooling means comprising an intake area and a discharge area, wherein the intake area is located towards a front of the vehicle and is configured to be substantially as wide as the width between the at least two frame members, and the discharge area is located in the vicinity of the engine means and is configured to be substantially narrower in width than the intake area.

* * * * *